Oct. 17, 1939.    A. S. RIGGS    2,176,101
ANGULAR POSITIONAL CONTROL SYSTEM
Filed Sept. 18, 1936    3 Sheets-Sheet 1
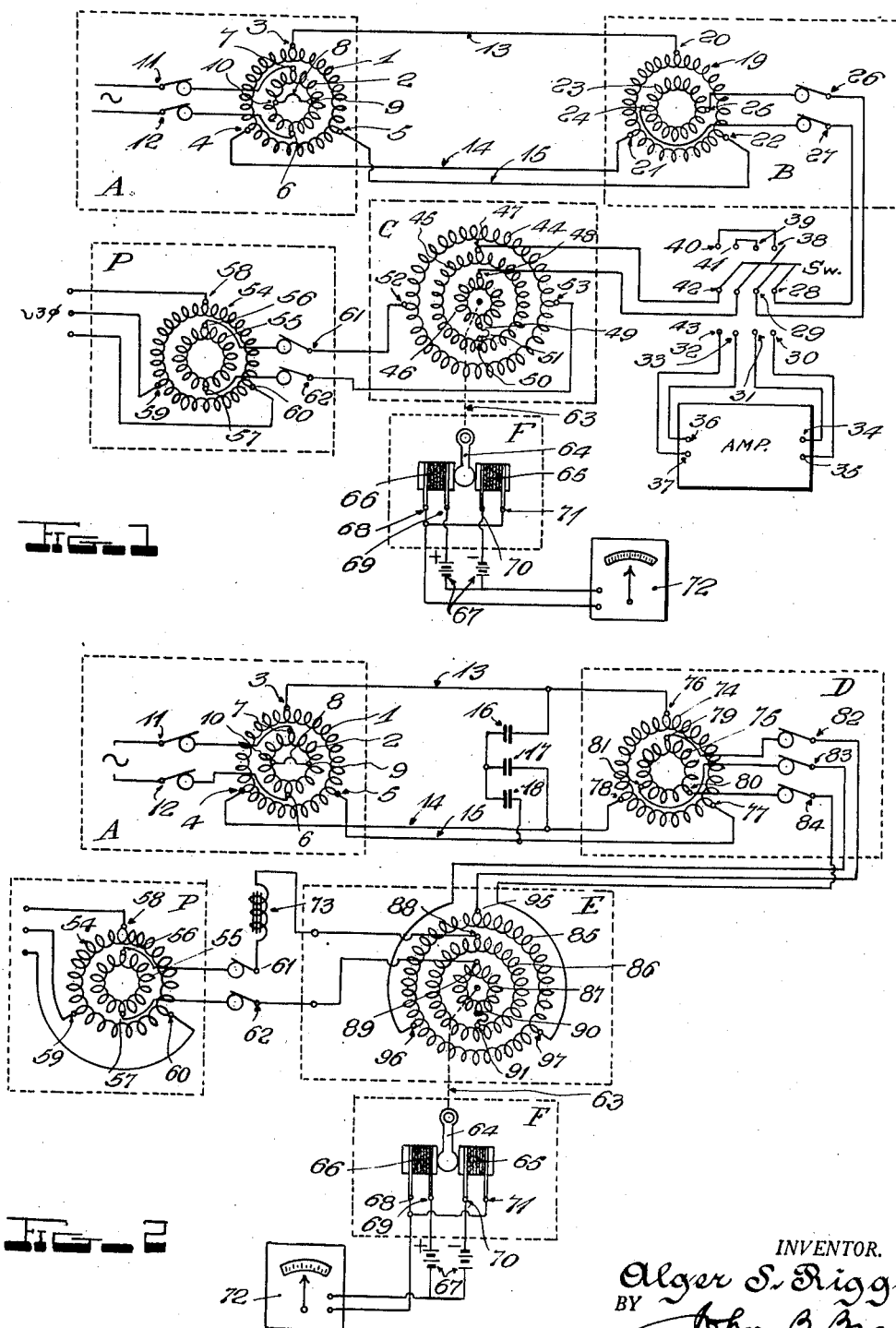
INVENTOR.
Alger S. Riggs,
BY John B Brady
ATTORNEY.

Oct. 17, 1939.　　　　A. S. RIGGS　　　　2,176,101
ANGULAR POSITIONAL CONTROL SYSTEM
Filed Sept. 18, 1936　　　3 Sheets-Sheet 2
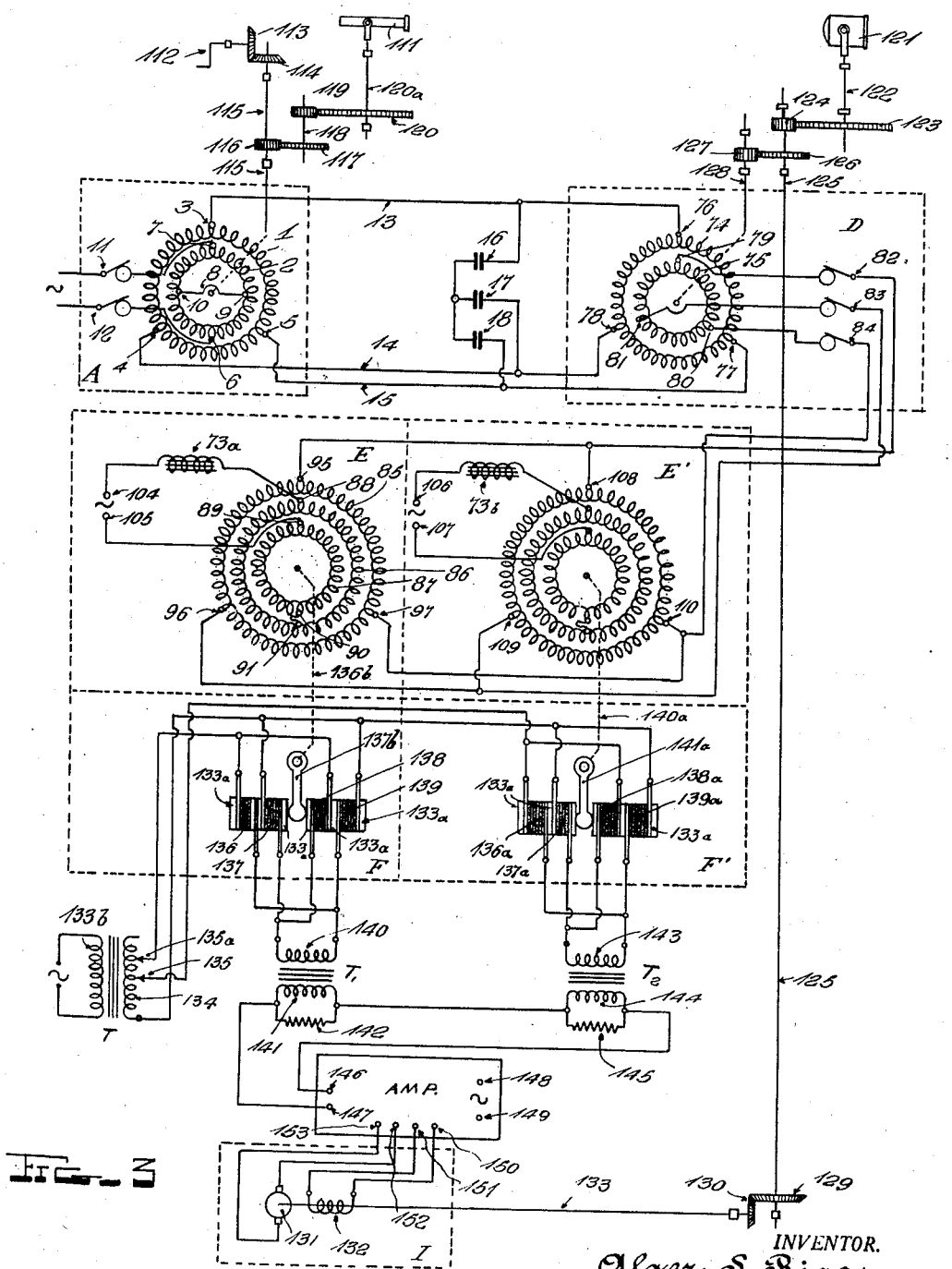
INVENTOR.
Alger S. Riggs,
BY John C. Brady
ATTORNEY.

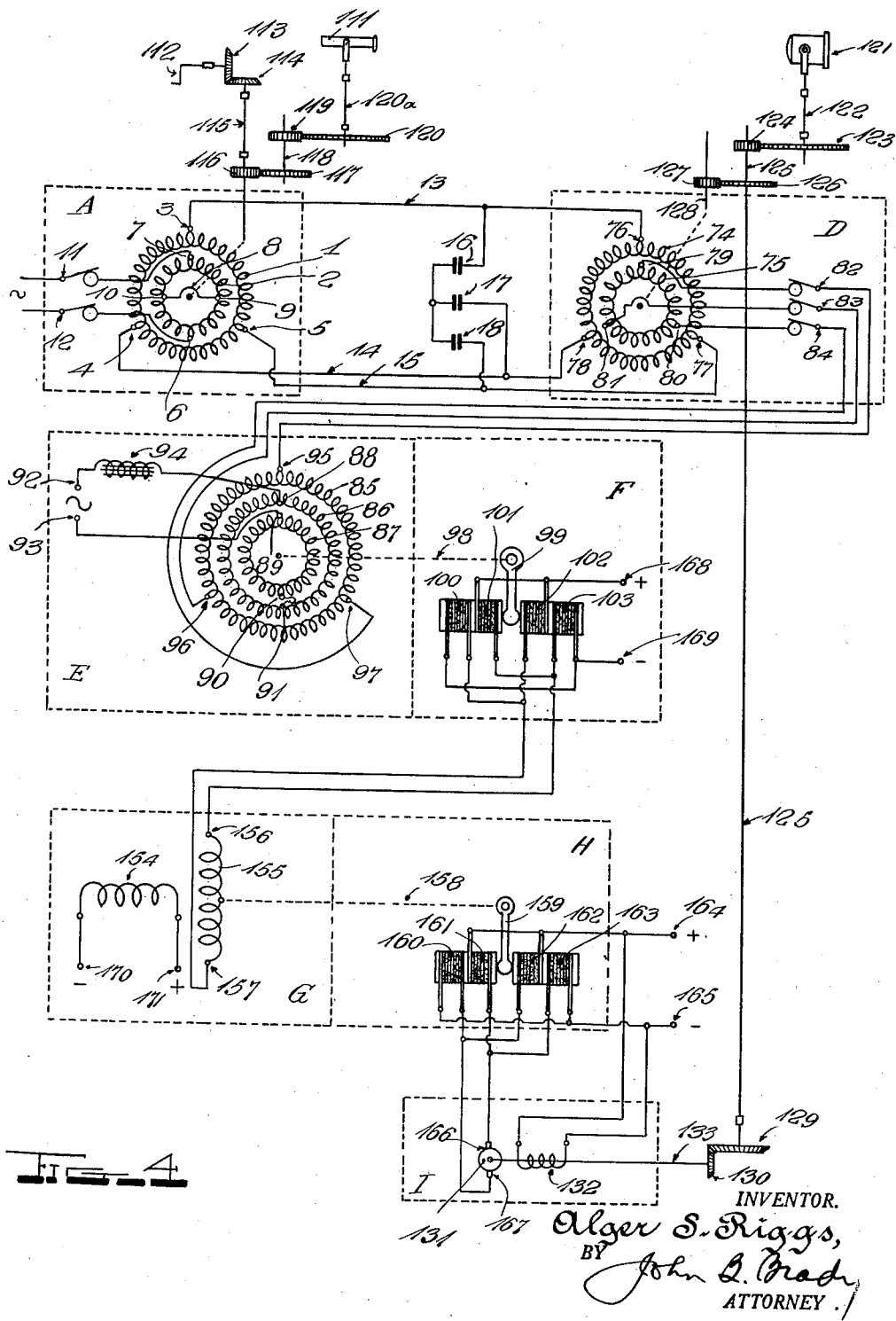

Patented Oct. 17, 1939

2,176,101

UNITED STATES PATENT OFFICE 2,176,101

ANGULAR POSITIONAL CONTROL SYSTEM

Alger S. Riggs, Washington, D. C., assignor of one-third to John B. Brady, Washington, D. C.

Application September 18, 1936, Serial No. 101,529

10 Claims. (Cl. 172—239)

My invention relates broadly to electrical control systems, and more especially to electrical control systems wherein objects such as guns, steering gears and searchlights may be controlled in angular position and speed from a remote point by the utilization of the so called "Selsyn" method of data transmission.

One of the objects of my invention is to provide means for securing a directional control signal from a data transmitter whereby a heavy object may be controlled in angular agreement with said transmitter.

Another object is the provision of means whereby a signal may be taken from a data transmitter for controlling a heavy object in angular agreement with the transmitter without imposing a load on the transmitter as a function of disagreement between the angular position of the rotor and stator of the transmitter and the angular position of the rotor and stator of a receiver connected to the transmitter.

Still another object of my invention is the provision of means whereby a directive signal for controlling a heavy object may be taken from a transmitter whereby the inertia of the controlled heavy object may be properly controlled to permit dead beat or non-hunting action.

A further object of my invention is the production of a control system for remote control of heavy objects from a transmitter in which high degrees of accuracy of agreement and stability may be obtained without undue complication and delicacy of apparatus.

These and further objects of my invention will be manifest from the following specification and accompanying drawings forming a part of this application, and in which:

Figure 1 is a diagrammatic circuit arrangement showing how two separate signal components, viz.: displacement voltage, and "rate" voltage may be separately measured in a "Selsyn" control system; Fig. 2 is a diagrammatic circuit arrangement capable of showing the same features as Fig. 1 but without causing coercion on the transmitter due to disagreement between the angular positions of the rotors of transmitter and receiver; Fig. 3 is a diagrammatic circuit arrangement of a complete control system employing my present invention wherein provision is made for adjusting either displacement or rate components of signal independently of each other, and suitable for any type of amplification system for driving the motor; and Fig. 4 is a diagrammatic circuit arrangement of a complete control system employing my present invention wherein the motor is controlled by compression resistance controls of the carbon disc type, requiring no electron tubes for amplification purposes, and wherein the displacement and rate components actuate a common controller which may be made to respond differently to displacement and rate components of signal upon adjustment of certain control quantities.

Referring to the drawings, and especially to Fig. 1, the control system forming a part of my present invention may be functionally demonstrated by the apparatus shown in schematic form, where A is a "Selsyn" transmitter, B is a "Selsyn" receiver adapted to provide voltages at its secondary terminals upon relative displacement of its rotor and the rotor of the transmitter. C is a dynamometer device which produces a torque functional upon relative displacement between transmitter and receiver. F is a compression resistor controller adapted to translate the torque of the device C into current changes from the battery 67.

The transmitter A consists of the primary windings 2 (here shown on the rotor) having connected at opposite points 6—7 a source of alternating current power at terminals 11—12. The primary winding is short circuited across points 9—10 for the purpose of preventing or more correctly limiting, a flux on other than the magnetic axis corresponding to points 6—7. The secondary winding 1 (here shown on the stator) is tapped at points 3—4—5, thereby simulating a three phase fully distributed winding. Through conductors 13—14—15 the secondary of the transmitter is connected to the primary of the receiver B at points 20—21—22 of the winding 19 (here shown on the stator). By such connection it is evident that the flux in the stator, or primary, of the receiver is at all times substantially on the same angular plane as the flux at the transmitter primary corresponding to points 6—7. The secondary winding of the receiver comprising the winding 23, tapped at points 24—25 (and here shown on the rotor) has induced in it a voltage proportional to the cosine of the angle of its magnetic axis to that of the stator or primary winding 19. It therefore follows that when the two rotors (transmitter and receiver) are at 90° as shown in Fig. 1 there is no voltage present at terminals 26—27 of the secondary of the receiver, and that the voltage across these points is proportional, roughly, to the sine of the displacement between transmitter and receiver rotors when the zero position is as shown in Fig. 1.

Now upon relative displacement of the two rotors, the voltage at points 26—27 is due to magnetic induction between the two windings of the receiver, however, upon moving the receiver rotor, or displacing the receiver stator flux by moving of the transmitter rotor, there is present at terminals 26—27 a second voltage due to generator action of movement of winding 23 in the stator flux. This generated voltage is 90° out of phase with the induced voltage due to angular displacement, and is proportional to the rate of the movement and the sine of the angle between the magnetic axes of stator and rotor of the receiver. When at angle of zero displacement voltage, the rotor is at the position for maximum voltage due to generator action, and hence if this generated voltage is correctly utilized high degrees of damping or surge arresting may be introduced into a control system where a heavy object is being controlled in angular position from a distant point.

In order to illustrate the practicability of utilizing the generated voltage of the receiver for control purposes I have provided the electrodynamometer device C which is adapted to control the current from battery 67 through the meter 72.

To fully understand the functioning of the system in its elementary form, assume the switch $Sw$ to be in the upper position so that terminals 26—27 of the secondary of the receiver are connected to points 48—47 of the windings of the dynamometer device C.

The dynamometer device C consists of three separate windings: the field winding 44 (here shown on the stator) tapped at points 52—53 and energized from the three phase source through the phase controller P in such manner that the phase of the voltage across points 52—53 may be variably controlled. The frequency of the three phase source is the same as that of the single phase connected at terminals 11—12. Reacting with the stator field winding is the rotor, or armature winding 46 which has its magnetomotive force neutralized by the compensating winding 45 on the stator (wound in the same slots with the field winding 44). The windings 45—46 are so connected together, at points 49—50 that their magnetomotive forces are opposed, and are of such turn ratio that when their axes coincide there is no flux produced on the armature axis (here shown as the vertical axis between points 48—49).

Now under this condition the device C corresponds to a fully compensated commutator type motor, and currents in the armature winding 46 react upon the field flux of winding 44 to produce a torque tending to rotate the rotor. When the field and armature axes are at 90° as shown, the conditions for maximum torque are present, and the torque produced is dependent upon the value of the armature current, and that portion of the field flux which is in phase with the armature current.

The carbon disc controller F consisting of the lever 64 connected to the rotor 46 through shaft 63 and the coacting compression resistor units 65—66 translates torque of the device C into resistance unbalance and consequent deflection of the current indicating meter 72. The compression controller is so proportioned that rotation of the rotor of the device C is restricted to a very small angle, hence for all conditions the magnetic axes of the windings 45—46 are substantially parallel, and compensation is complete. Resistor unit 66, connected through leads 68—69, is operative to vary the current in one sense, for example to increase the current to meter 72 causing deflection in one direction; whereas the resistor unit 65, connected through leads 70—71, is operative in the opposite sense, to decrease the current and cause deflection in the meter 72 in the opposite direction.

Suppose now that a fixed displacement of say 3° is established between transmitter rotor 2 and receiver rotor 23 (displacement reckoned from zero position as shown) and that the displacement is in say a clockwise direction. That is, the stator field flux interlinking the receiver rotor is moved 3° clockwise. A current due to induced voltage in winding 23 will flow in the armature and compensating windings 46—45 of the device C and the resulting torque will compress one or expand the other of the carbon piles 65—66, hence deflecting the pointer of the instrument 72. Now by rotation of the rotor winding 55 of the phase controller P, this torque and consequent instrument deflection can be made a maximum in either direction, passing through zero when the voltage supplied to the field winding 44 at points 52—53 is of such phase that the resulting flux is 90° out of phase with the current through windings 45—46. Now let the phase controller be so adjusted that the meter deflection is a maximum in a clockwise direction. With the phase control rotor locked in this position the deflection of the meter pointer will be dependent substantially upon the electrical displacement of the receiver rotor 23, and will reverse upon reversing the receiver rotor displacement. The instrument indication is now proportional to displacement between transmitter and receiver zero points and is the equivalent counterpart of the displacement control signal used for follow-up control purposes.

Now suppose that a 3° clockwise field flux displacement is established at the receiver rotor 23 as before, and the rotor of the phase controller P be rotated through 90° and locked in this position. Though there is the same current through the windings 45—46, there is no torque and consequent deflection of the pointer of the instrument 72 since the flux of the field of the device C is 90° displaced from the armature current. In this condition the device C has zero torque due to the angle of displacement of the field flux with respect to the receiver rotor 23, but is responsive only to movement of the field flux with respect to the receiver rotor. The instrument deflection is now proportional to the rate at which the field flux interlinking the receiver rotor 23 is moved about its axis since the generated voltage in the winding 23 produces current in 45—46 which is in phase with the field flux of the device C. The instrument deflections now represent the counterpart of the rate control component which may be utilized to stabilize a follow-up remote control and prevent hunt and overshoot.

By adjusting the phase of the field voltage supplied at points 52—53 the instrument deflections may be made dependent upon the relative displacement of the receiver rotor 23 plus or minus the rate of change of this displacement. And the response to either displacement or rate of change of displacement in both direction and magnitude may be independently adjusted by adjustment of the phase of the field voltage supplied at points 52—53 of the field winding 44 of the device C.

With the switch thrown in the other position, the amplifier provides means for accentuating the effects of displacement of receiver rotor 23.

In Fig. 1 there is mutual coercion between the receiver and transmitter inasmuch as relative displacements produce flux distortion and resulting torque on the transmitter and receiver rotors. This coercion is detrimental in electrical remote control systems inasmuch as it gives rise to angular inaccuracies in the transmitter flux with consequent effects on all repeaters or receiver motors which may be operated from the transmitter.

Although I have not so shown, in practice there are usually numbers of receivers operating in conjunction with the transmitter and it is essential that the various control systems such as searchlight and gun controls do not detrimentally affect these receivers.

In Fig. 2 I have shown a diagrammatic arrangement of a circuit by which my invention may be shown substantially as in Fig. 1, except that there is no mutual coercion between the control system and the transmitter, consequently, regardless of whether the control system is in agreement or not, the accuracy of the transmitter is unaffected in relation to the other receivers which may be connected to it.

The circuit diagram of Fig. 2 is fundamentally similar to Fig. 1, except that the electrodynamometer device E which operates the compression controller F functions in slightly different manner.

The secondary of the transmitter is connected at points 3—4—5 through conductors 13—14—15 to points 76—78—77 respectively of the primary winding (here shown on the stator) 74 of the differential transformer D. The rotor winding 75 (secondary) of the differential transformer D is tapped at points 79—80—81 and through slip rings brought out to terminals 82—83—84. The secondary 75 is connected to the field winding 85 of the dynamometer device E, points 79—80—81 of the secondary 75 being connected to points 95—97—96 respectively of the field winding 85. The "armature" circuit of the device E consists of the rotor winding 87 and the "compensating" winding 86 (on the stator and wound in the same slots as the field winding 85). Current from the phase controller is supplied to the "armature" circuit at points 88—89, and the windings 86—87 are so connected at points 90—91 that their magnetomotive forces exactly neutralize, hence a current can flow through the "armature" or rotor winding without producing a flux along the 89—90 axis. It will now be obvious that if the current through the windings 86—87 is held constant (this is facilitated by the optional inductance 73) that the rotor current can react with the field flux produced by the current in winding 85 only when it contains a space component on the axis at right angles to the axes 89—90. Relative displacement of the receiver rotor (secondary of the differential transformer D) 75 swings the field flux of the device E to one or the other direction from the "normal" or 89—90 axis of the rotor.

The rotor torque is proportional to the sine of the angle of displacement between the normal axis of the rotor, the rotor current, and that portion of the field flux which is in phase with it. The phase controller P is provided for the purpose of demonstrating the phase-torque relations in the circuit of Fig. 2 the same as those of Fig. 1.

The "rate" component is generated in the receiver D by relative rotation of its rotor and stator fields, and results in a flux in the field of the device E along the axis at right angles to the normal axis 89—90. The general functioning of the apparatus and circuit of Fig. 2 is similar to that shown in Fig. 1, except that:

In Fig. 1 the dynamometer has a fixed field strength at right angles to its rotor magnetic axis—and derives its torque by change of rotor current due to signal, whereas:

In Fig. 2 the dynamometer has a fixed "armature" current and a fixed field flux, normally on the same magnetic axis, while its torque is developed by shifting the field flux away from the magnetic axis of the "armature" in accordance with relative displacement between the transmitter and receiver "normal" positions with relation to each other, and by the reaction of the armature current on the "generated" or rate flux which is produced in the receiver D and transferred to the field of the device E at substantially right angles to the magnetic axis of the rotor or armature.

The phase controller P (identical in both Fig. 1 and Fig. 2) consists of a primary winding 54 supplied at points 58—59—60 from a three phase source of power of the same frequency as the source connected at terminals 11—12, and a secondary winding 55 tapped at points 56—57 and brought to terminals 61—62 through the slip rings.

Referring to Fig. 2 it is obvious that the flux of the field winding 85 is undistored by rotation inasmuch as the "armature" circuit is completely compensated. Therefore no coercion is produced on the transmitter regardless of the angular position of the receiver rotor 75, though the torque of the device E and consequently the deflection of the instrument 72 is zero when the field flux axis corresponds to the "armature" axis and reaches maximum for a displacement between transmitter and receiver corresponding to 90°. Although no coercive effects are present in the system of Fig. 2, there is present the reactive currents (or magnetizing currents) of the receiver D and the device E, and the static condensers 16—17—18 are provided for partly producing this wattless current, hence lessening the load on the transmitter.

Referring now to Fig. 3, I have shown a complete electrical control system embodying my present invention wherein a searchlight is controlled in angular movement and position through a control system responsive to a transmitter operated from a telescope. In this system the searchlight is made to follow the angular position of the telescope, and separate responsive devices or dynamometers are utilized to control the drive motor in accordance with displacement and rate components of signal. The control system to the input of the amplifier is shown, and the amplifier may be of the electron and/or gas tube type or of tubeless construction. The purpose here is primarily to illustrate the functioning of the primary control system.

Still referring to Fig. 3, the telescope 111 is controlled in angular position via the hand crank 112, gears 113—114, shaft 115, gears 116—117, shaft 118, gears 119—120 and shaft 120a. Simultaneously the rotor of the "Selsyn" type transmitter A is rotated by the shaft 115. The position of the flux in the stator 1 of the transmitter is conveyed through conductors 13—14—15 to the stator of the receiver D comprising the winding 74 tapped at 120° points 76—77—78. The condensers 16—17—18 serve to partly supply the magnetizing currents of the receiver D and its associated apparatus to relieve the transmitter of part of the wattless current load. Through the control system the reversible motor I, serves to drive the searchlight 121 in angular agreement with the telescope through the mechanical system of shaft 133, gears 130—129, shaft 125, gears 124—123, and shaft 122. Simultaneously, the rotor 75 of the receiving device (or differential transformer) D is rotated by the system constituted by gears 126—127, and shaft 128. The gear ratios are such that transmitter and receiver are geared at the same ratio to the telescope and searchlight respectively.

When light and telescope are in agreement the field fluxes of the dynamometer devices E and E' are in a plane along the vertical axis corresponding to points 89—90 of the device E. The armature circuit of the device E is supplied at points 104—105 with power of such phase that its rotor reacts (produces a torque) principally due to displacement of the field flux, while the device E' is supplied at points 106—107 with power of such phase as to cause its rotor to produce torque due primarily to "rate" flux in its field windings produced by the rate of relative movement of the receiver rotor 75 and the flux produced by the receiver stator winding 74.

Now suppose the transmitter rotor is relatively displaced in clockwise direction. This results in a clockwise shift of like angular magnitude in the fluxes of the devices E and E'. During transition from zero displacement, depending on rate of change of displacement, a flux is also produced in the devices E and E' at right angle to their armature axes and also 90° in phase from the normal flux. The device E' reacts to this rate flux, compressing through shaft 140a and crank 141a, the carbon pile resistors 136a and 137a and releasing pressure on opposite piles 138a and 139a.

This clockwise torque from device E' results in an alternating current voltage across the primary 143 of the transformer T₂ which is proportional to rate of change of rotative displacement. Simultaneously the shifting of the flux in device E produces a pressure through shaft 136b and crank 137b on the carbon pile resistors 136—137 and a decrease of pressure on piles 138—139.

This clockwise torque from E results in an alternating current voltage across the primary 140 of the transformer T₁ due to angular relative displacement.

The secondaries 141 and 144 of the transformers T₁ and T₂ are connected in series to the input of the motor control amplifier at terminals 146 and 147. The resulting signal drives the motor in a direction to move the light 121 and the rotor 75 in a clockwise direction to equal the original displacement of the transmitter, thus bringing the fluxes of devices E and E' back to normal or along the axis 89—90 of device E. However, the inertia of the system driven by the motor would tend to make the rotor 75 "overshoot" the coincidence point were it not for the fact that the movement of rotor 75 toward the coincidence point produces a flux along the horizontal (right angles to normal along 89—90) axis of the devices E and E' of such phase that device E' reverses its torque to a counterclockwise direction proportional to rate of movement, thus producing across the primary winding 143 of transformer T₂ a signal opposing the signal on primary 140 of transformer T₁ due to displacement. The resulting net signal at terminals 146—147 of the power amplifier therefore reaches zero and may reverse before actual coincidence is reached, thereby bringing the motor to rest without overshooting the coincidence point.

In other words the voltage at the transformer T₁ produced by the torque of device E tends to drive the motor in a direction to establish normal or coincidence, while the voltage at the transformer T₂ produced by torque of device E' tends to energize the amplifier and consequently drive the motor in a direction to oppose relative movement of the rotor 75 and the flux produced by the current in the stator winding 74. The system therefore has a component of rate of change of displacement between transmitter and receiver which assists accelerating the motor while displacement is increasing and which assists in stopping the motor while the displacement is decreasing.

Both rate and displacement signals could be supplied to the device E upon proper adjustment of the phase of the voltage supplied at points 104—105, but the separate devices are shown for purposes of illustrating adjustment of rate and displacement components independently of each other. The transformer T is supplied at its primary 133b with power of correct phase to control the amplifier, and adjustable taps 135—135a on the secondary 134 permit of adjustment of the magnitude of the response in voltage versus torque of the devices E and E' respectively, independently of each other.

Referring now to Fig. 4, I show a complete electrical positional control system wherein amplification is effected without the use of electron discharge devices.

Control is obtained by pressure control acting on a group of carbon compression resistors in accordance with displacement and rate of change of displacement between transmitter and the controlled object, which is here shown as a searchlight. In this figure, like reference characters are used to designate points similar to corresponding apparatus in Fig. 3.

In the circuit shown in Fig. 4 the displacement and rate of displacement signal produces a resultant torque in the electrodynamometer device E, thus compressing either of two sets of carbon disc resistor units, the units 100—101 forming one set and the units 102—103 forming the other set. The resulting signal from the compression controller F (comprising the units above and operating crank 99 with shaft 98) is impressed upon the rotor 155 of a second and larger electrodynamometer device G, operating on direct current, and this last mentioned device through the shaft 158 and crank 159 operates the compression controller H (composed of the two sets of carbon discs 160—161 as one set and the carbon discs 162—163 as the other set) which in turn energizes the motor armature 167 from the source of D. C. power connected at points 164—165.

In order to understand the operation of the circuit in Fig. 4, suppose that the transmitter and receiver rotors 2 and 75 respectively are in the relative positions shown. Now under this condition there is no torque at device E, and resulting pressure on the carbon compression controller F, hence likewise no torque from the device G with consequent pressure on the compression controller H. The current through the armature 131 is therefore zero. It is assumed that an alternating current source of proper phase and frequency is supplied at points 92—93, optionally through the inductance 94, for energizing the armature circuit of the device E so as to provide torque response in accordance with displacement of its field flux and/or a rate voltage generated by the rate of relative movement of the rotor 75 and the flux of winding 74. Likewise D. C. is supplied at points 168—169 so that pressure on either set 100—101 or 102—103 of carbon discs will result in a current through the rotor winding 155 of the device G. Likewise the "field" 154 of device G is connected at terminals 170—171 to a source of D. C. power. A source of D. C. power is also connected at points 164—165 for operation of the power motor I; the field winding 132 is connected across the points 164—165 while the armature is connected to the source at 164—165 through the compression controller H, comprising the compression controlled carbon disc resistor 160—161 as one set and the disc resistors 162—163 as the other set The controller F comprising the resistors 100—101—102—103 in Fig. 4, constitutes a bridge normally balanced when there is no torque on the device E and unbalanced with resulting current from 168—169 through the rotor winding 155 of the device G upon the presence of torque at the rotor of device E. Likewise the controller H comprising the resistors 160—161—162—163 constitutes a bridge normally balanced when there is no torque on the device G, and unbalanced with resulting current through the armature 131 upon the presence of torque at the rotor of device G. Controllers F and F', Fig. 3, likewise are constituted as bridge circuits.

Suppose now that the rotor 2 of the transmitter A be moved clockwise by some small angle from that shown. The field of the device E is moved a like angle, thereby resulting in a clockwise torque of the rotor 87 and through shaft 98 and crank 99 the resistors 100—101 are "compressed" while the resistors 102—103 are "uncompressed". This unbalance results in a current through the rotor coil 155 of the device G whereby its terminal 156 becomes of polarity corresponding to point 168, while point 157 becomes of polarity corresponding to point 169. The current through 155 therefore results in a clockwise torque at the shaft 158 and the crank 159 compresses the resistors 160—161 while simultaneously releasing pressure upon the resistors 162—163, this results in a current through the motor armature of such direction that brush 166 is at the polarity of point 164 while brush 167 is at the polarity of point 165. Now the field of the motor is so polarized that the resulting motor torque drives the motor in a direction to rotate the rotor 75 of the receiver D in clockwise direction to bring the field flux of the device E back to normal, i. e.:—on an axis corresponding to points 89—90.

Coincident, however with movement of either the rotor 2 or the rotor 75 a voltage is generated in the winding of rotor 75 providing a flux in device E at right angles to the axis of points 89—90 with resulting torque and compression of controller F, device G and controller H, to oppose the motion generating the voltage. Hence by proper phase setting of the current supplied at points 92—93 the relative magnitudes and directions of displacement torque and rate of displacement torque at the rotor of device E may be so adjusted that the motor I is controlled in such manner as to bring the searchlight smoothly into angular agreement with the telescope without hunt or overshoot.

The general process described for clockwise displacement is similarly present in reverse direction for counter-clockwise displacement.

When the telescope is being moved angularly at some fixed speed the motor drives the searchlight at like speed but with a small angular disagreement which provides the operating "signal" or control torque at the device E. When running under actual conditions the voltage generated by relative movement of the two rotors 2 and 75 provides a high damping component of control whereby the system driving the searchlight is free from "surging" or dynamic hunt.

In practical construction of a control system such as shown in this application, I have utilized devices at E and E' of the same size as the receiver device D, while the device G must be slightly larger since its torque operates a controller (H) which controls considerable power.

Practically the device G resembles a conventional D. C. motor with salient poles, while the rotor is a conventionally wound armature with no commutator, but tapped at opposite points for connection to the controller at terminals 156—157. The flux of the field should be sufficiently high to much more than saturate the iron of the rotor so that the inductance of the "armature" or rotor circuit 155 is negligible. This permits of quick response in controlling the motor.

The carbon disc resistors are preferably made up of a large number of thin discs in order to secure maximum range of resistance change, and the controllers F and F' should be so designed that the movements of the driving cranks are limited to a fraction of a degree. In other words, the mechanical movement required to produce a given resistance change must be kept as low as possible in order that the control system may respond quickly to any displacement or rate of displacement signals resulting from displacement and/or rate of displacement between transmitter and receiver rotors.

Although I have shown my invention in specific forms for the purpose of illustrating and describing its operation, I do not desire to be limited thereto. In the utilization of my invention any system may be controlled in angular relation to a "Selsyn" data transmitter, as for instance searchlights, guns, steering gear mechanism and fire control mechanism in general, though not limited thereto.

Although I have shown and described my control as adapted to searchlight azimuth control I do not desire that it be limited except to the extent of the appended claims.

What I claim as new and desire to secure by Letters Patent of the United States is as follows:

1. In an electrical positional control system, a transmitter having a primary and a secondary winding rotatably mounted with relation to each other whereby rotation of the primary relative the secondary winding produces a flux in the secondary winding corresponding to the angular position of the primary winding; a receiver having a primary winding and a secondary winding rotatably mounted with relation to each other, means for electrically connecting said transmitter secondary with said receiver primary whereby the flux axis of the said receiver primary corresponds with the flux axis of the transmitter primary, means for rotating said receiver primary and secondary with relation to each other by a reversible motor, means responsive to the voltage across said receiver secondary for controlling said motor to rotate said receiver primary and secondary in relation to each other to reduce the secondary voltage to zero, separate means responsive to the voltage generated in said secondary by its relative movement to said primary flux for controlling said motor to produce a torque opposing said movement between said secondary and said primary flux.

2. In an electrical control system, in combination, a transmitter having a single phase primary winding wound upon its rotor, a polyphase secondary winding wound upon its stator, a receiver having a polyphase primary stator windings and polyphase secondary rotor windings, means for connecting like points of said transmitter secondary and said receiver primary together whereby the angular position of the primary of said transmitter relative its stator causes a flux along the corresponding axis of the stator of said receiver, means for connecting the polyphase secondary of said receiver to corresponding points of the polyphase field winding of an electrodynamometer device whereby rotation of said transmitter primary, or of said receiver secondary, rotates the flux axis in said dynamometer device, means for producing an inductively compensated armature current in said dynamometer device to produce torque against said field, means for translating said torque into a directive signal dependent upon the displacement of said field, means for utilizing said signal for operating a reversible motor for rotating said receiver rotor to reduce said displacement to zero, and means in said dynamometer device for producing a torque due to the voltage generated by the relative movement of said receiver secondary winding and its primary flux, means responsive to said torque for controlling said motor torque to oppose said motion of said secondary and said primary flux of said receiver, and means including static condensers for reducing the components of magnetizing current taken from said transmitter by said receiver and said electrodynamometer device.

3. Means for producing a directive torque from a "Selsyn" transmitter for control purposes comprising a polyphase winding of said transmitter connected through a differential transformer to the polyphase field winding of an electrodynamometer device having a compensated armature energized from a suitable source of power, whereby said armature reacts against the flux of said field to produce torque when the said flux is along other than the magnetic axis of said armature, and including means for restricting rotation of said armature so that the reluctance of said field is unchanged by its relative angular position to said armature.

4. In an electrical angular positional control system, a transmitter of angular directions and a control system for positioning a controlled motor actuated object in accordance with said angular directions, said control system constituting means responsive to angular differences between said angular directions and the relative angular position of said controlled object for controlling the speed and direction of rotation of the motor for reducing said angular differences to zero, said control system comprising means including a dynanometer for producing a torque functional upon angular displacement of the field flux of the dynamometer from a normal plane, means including a compression bridge resistor responsive to said torque for producing an electromotive force substantially proportional in magnitude and direction to said torque, a second dynamometer device responsive to said electromotive force for producing a higher torque than said first mentioned torque dependent in direction and magnitude on said electromotive force, means including a compression bridge resistor for producing an electromotive force substantially proportional in direction and magnitude to said last mentioned torque, a reversible motor having its field constantly energized, means for impressing said last mentioned electromotive force on the armature of said motor whereby said motor runs in direction and speed dependent upon said last mentioned electromotive force, a differential angular connecting device, means mechanically associated with said motor for operating said differential angular correcting device for removing said angular displacement of said field flux of said first mentioned dynamometer, and means mechanically operated by said motor for moving the controlled object in synchronism with the movement of said differential angular corrective device.

5. In an electrical angular positional control system, a transmitter of angular directions, an object positionally controlled in accordance with said directions, a reversible motor for positionally controlling said object, means responsive to positional disagreement between said directions and said object for energizing said motor, said means including a dynamometer having an electrically rotatable field, and armature windings, means for constantly energizing said armature windings with current of fixed phase and magnitude, means for rotating said field from a normal plane coincident with the magnetic axis of said armature synchronously with said transmitter, means responsive to movement of said controlled object for rotating said field differentially to said transmitter whereby said field is held stationary in one plane when said transmitter and said controlled object are running at similar relative speeds and directions, means including said dynamometer for producing a torque dependent in direction and magnitude upon the position of said field from said normal plane, means for producing an electromotive force responsive in direction and magnitude to said torque, a second dynamometer having a constantly energized field at normal right angles to its armature magnetic axis, means for impressing said electromotive force upon the armature of said last mentioned dynamometer, means responsive in direction and magnitude to the torque produced by said last mentioned dynamometer in response to said electromotive force for producing a second electromotive force of greater magnitude than said first mentioned electromotive force, means for impressing said last mentioned electromotive force upon the armature of said motor, and mechanical means connected with said motor for driving said controlled object.

6. In an electrical angular positional control system, a transmitter having a single phase primary winding rotatably mounted in relation to a polyphase secondary winding, means for energizing said primary winding with alternating current and power, means for relatively rotating said primary and secondary windings, a differential transformer having a polyphase primary winding rotatably mounted in relation to a polyphase secondary winding, circuit connections between said transmitter secondary winding and said differential transformer primary winding, an electrodynamometer having a stator and rotor, armature windings upon said rotor and a compensating winding upon said stator for neutralizing the magnetomotive force of said armature winding, means for energizing said armature and compensating windings from a source of alternating current power of like frequency but of adjustable phase to that supplied to said transmitter primary, a polyphase field winding upon the stator, whereby the armature current may react with the field flux to produce torque of direction and magnitude depending upon the displacement of the field flux axis from the armature magnetic axis, and electrical circuit connections between said polyphase field windings and the polyphase secondary winding of said differential transformer, a carbon compression bridge resistor controller having a source of direct current power connected at two opposite points, mechanical means responsive to torque between said armature current and said field flux for compressing two arms of said compression resistor and releasing pressure on the other two arms of said compression resistor, whereby said bridge is unbalanced in direction and magnitude in accordance with direction and magnitude of said torque, and whereby an electromotive force is established through said unbalance across the remaining terminals of said bridge, a direct current electrodynamometer having a constantly energized stator field, and a rotor rotatably mounted in said field, a winding upon said rotor normally having its magnetic axis at right angles to said field, connections from said winding to said remaining terminals of said bridge, whereby said unbalance establishes a current and resulting torque in said direct current dynamometer, a second carbon compression bridge resistor controller having a source of direct current power connected at two points, mechanical means responsive to torque of said direct current electrodynamometer for compressing two arms of said bridge and releasing pressure on the other two arms whereby said bridge is unbalanced in direction and magnitude in accordance with direction and torque of said direct current electrodynamometer, and whereby an electromotive force is established through said unbalance across the remaining terminals of said bridge, a direct current shunt motor having constantly energized fields and having its brushes connected across said last terminals of said bridge whereby said motor develops torque and consequent rotation of direction and magnitude depending upon said last mentioned electromotive force, means connecting said motor with a heavy object to be angularly controlled by said transmitter, and a mechanical connection whereby said motor rotates relatively the primary and secondary of said differential transformer with consequent rotation of the field flux of said first mentioned electrodynamometer.

7. In an electrical control system, a transmitter of angular directions comprising a single phase primary winding energized from a source of alternating current power, a three phase secondary winding rotatably mounted with respect to said primary winding, a differential transformer having a three phase primary winding and a three phase secondary winding rotatably mounted with respect to each other, circuit connections between corresponding terminal points on the transmitter three phase secondary winding and the differential transformer primary winding, an electrodynamometer having a three phase field winding and a single phase compensating winding fixed in relation to each other but rotatably mounted in respect to a rotor winding, electrical connections between said rotor and said compensating windings whereby their magnetomotive forces cancel each other and means for supplying a current through both of said windings of like frequency but adjustable in phase from that supplied to said transmitter primary, whereby said current may react to produce torque between said rotor winding and the flux produced by said field windings, electrical connections between corresponding points of said differential transformer three phase secondary winding and said electrodynamometer three phase field windings, and means responsive to torque of said electrodynamometer for controlling the speed and direction of rotation of an electric motor in response to said torque, means responsive to said motor rotation for relatively rotating said primary and secondary windings of said differential transformer, and means mechanically connected to said motor for driving a load.

8. In an electrical control system, a transmitter of angular directions comprising a single phase primary winding energized from a source of alternating current power, and a three phase secondary winding rotatably mounted with respect to said primary winding, a differential transformer having a three phase primary winding and a three phase secondary winding rotatably mounted with respect to each other, circuit connections between corresponding terminal points of the transmitter three phase secondary winding and the differential transformer primary winding, two electrodynamometers each having a three phase field winding and a single phase compensating winding fixed in relation to each other but rotatably mounted with respect to their rotor windings, electrical connections between said rotor and said compensating windings whereby their magnetomotive forces cancel each other and means for supplying a current through both of said windings of each electrodynamometer of like frequency but of independently adjustable phase from that supplied to said transmitter primary, whereby said currents may react to produce torques between said rotor windings and the fluxes produced by said field windings in said electrodynamometer independently of each other, electrical circuit connections between corresponding terminal points of both electrodynamometer field windings and the secondary winding of the said differential transformer, separate and independent means responsive in direction and magnitude to the torques of said electrodynamometers for producing electromotive forces corresponding to said torques, means for combining said electromotive forces, means responsive to said combined electromotive forces for controlling the speed and direction of rotation of a motor, mechanical means connected to said motor for driving a load, and means mechanically connected to said motor for relatively rotating said primary and secondary of said differential transformer.

9. The method of producing a signal for control purposes from a "Selsyn" data transmitting system, consisting of utilizing the voltage output of the transmitting system to provide an induced voltage proportional to the amplitude of the data signalled and a generated voltage proportional to the rate of change in amplitude of the data signaled, combining said induced and generated voltages in phase quadrature, and employing a voltage of intermediate phase and said combined voltages to produce a resultant signal by the coaction of the combined voltages with respect to said voltage of intermediate phase.

10. A controller for producing a signal from a "Selsyn" data transmission system including a transmitter having rotor and stator components, and a receiver having rotor and stator components; said controller comprising a dynamometer having a rotor and a stator, a polyphase field winding and a compensating armature winding mounted on the dynamometer stator, an armature winding of pole and phase similar to said compensating winding and of like effective turns mounted on the dynamometer rotor, an electrical connection between adjacent terminals of said armature windings, electrical connections at the remaining terminals of said armature windings for supplying current thereto whereby when the axes of said windings are on the same plane no resultant flux is produced by said armature current, driven means mechanically connected to said dynamometer rotor, means engageable by said driven means and effective to restrict movement of said rotor to a negligible angle; and connections from said polyphase field winding to said transmitter through said receiver whereby the dynamometer field flux may be rotated in accordance with the operative relation of the transmitter and receiver rotor components, said controller being adapted to control the movement of the receiver rotor component accordingly.

ALGER S. RIGGS.